Patented Jan. 14, 1936

2,027,682

UNITED STATES PATENT OFFICE 2,027,682

PROCESS FOR MAKING TRANSPARENT FILMS, FOILS, OR SKINS

Friedrich Eichmann and Herbert Nerad, Arnau-on-the-Elbe, Czechoslovakia

No Drawing. Application August 25, 1933, Serial No. 686,853. In Czechoslovakia September 10, 1932

5 Claims. (Cl. 18—57)

This invention relates to a process for making transparent films, foils or skins which is considerably simpler than the heretofore known processes; in this process water insoluble polysaccharides are worked up, and exist in the final product without any substantial change in their chemical structure.

Heretofore, transparent films were merely made by a process which in essence consisted in working up cellulose, or cellulose-like products, in the manner of the viscose, cuprammonium oxide, acetate, benzyl, ethyl or nitrate process, or gelatin by dissolution in water.

According to this invention water-insoluble polysaccharides having in their naturally occurring state a particle fineness of between approximately 0.3 to 50 microns, or reduced to this particle size by dry grinding, are swollen in an aqueous medium with avoidance of all chemical change, and the resulting hydrosol is layered to a film which is then dried. The film obtained has no apparent fibrous structure, and by the method provided by the invention films are produced by an essentially physical process which are comparable in every respect with those hitherto made by the complicated processes involving chemical reactions referred to above.

Examples of the insoluble polysaccharides which are used as raw substances for the purpose of the invention are cellulose, the carbohydrate gums, starch, and dextrin, but others may also be used.

The fineness of the insoluble raw materials depends upon the character of the same; the particles must be of a size including as far as possible all particle sizes within the limits of approximately 0.3 to 50 microns. If the natural substance does not already have a particle size within the said limits then it must be dry ground to the said particle size.

The swelling of the raw material is preferably promoted by elevating the temperature or by adding suitable swelling agents to the polysaccharides or to the swelling medium. Bases of all kinds, more particularly free alkalies, and salts, have proved to be suitable substances which promote swelling. The choice of this substance and the extent to which the swelling temperature is elevated depends essentially upon the raw materials used.

The raw materials worked up in accordance with this invention are then converted into thin layers, e. g. by means of band pouring machines, pouring tracks or the like, and dried and the films made in this may be treated during the production operations or after the drying with agents known per se for the purpose of raising the waterproof qualities, flexibility, incombustibility mechanical strength or the like. Suitable agents for this purpose are oils, resin solutions, lacs, starch solutions, alkali metal bromides, cellulose esters and the like.

Example 1

When using cellulose, arabin or xylane, the process may, for example, be carried out as follows: From 6 to 10% of solid sodium oxide is added to superdried raw materials and the whole is thoroughly mixed and ground in a colloid mill, or in some other suitable apparatus, to extreme fineness, it being preferable to exclude the presence of water. The grinding is continued until particle sizes of 0.3 to 40 microns are obtained. The resulting product is mixed with water until, when thoroughly stirred, a density of 1 can be read off on the aerometer. The swelling is accelerated by raising the temperature to approximately 55°. The swelling operation takes about 20 hours. The resulting viscous solution is converted into thin layers by known means, e. g., with the aid of pouring machines, and after evaporation of the water removed in the form of film, which, according to the use for the same which is in view, is made waterproof, non-inflammable or the like by impregnation with oils, lacs, cellulose esters, starch solutions or salts.

Example 2

Dextrin or starch is converted in a colloid mill to particle sizes of about 2 to 50 microns. The powder, after addition thereto of 8% magnesium chloride, is subjected to a swelling process at a temperature of approximately 60°. The resulting syrupy solution is worked up to film in a manner analogous to that described in Example 1.

Example 3

A mixture consisting of equal parts of cellulose and dextrin comminuted in accordance with Examples 1 and 2 is subjected to a swelling process with addition of caustic soda and after being thoroughly mixed up, film is then made from the product in accordance with Example 1.

What we claim is:

1. A method of making transparent films, consisting in selecting an insoluble polysaccharide, dry grinding it to a particle size of approximately 0.3 to 50 microns if not already of this particle size in the naturally occurring state, preparing a hydrosol of said polysaccharide by swelling the latter without chemical change in an aqueous medium, layering said hydrosol to a film, and drying the film formed.

2. A method of making transparent films, consisting in selecting an insoluble polysaccharide, dry grinding it to a particle size of approximately 0.3 to 50 microns if not already of this particle size in the naturally occurring state, preparing a hydrosol of said polysaccharide by swelling the latter in water, layering said hydrosol to a film, and drying the film formed.

3. A method of making transparent films, consisting in selecting an insoluble polysaccharide, dry grinding it to a particle size of approximately 0.3 to 50 microns if not already of this particle size in the naturally occurring state, preparing a hydrosol of said polysaccharide by swelling the latter without chemical change in an aqueous medium at an elevated temperature, layering said hydrosol to a film, and drying the film formed.

4. A method of making transparent films, consisting in selecting an insoluble polysaccharide, dry grinding it to a particle size of approximately 0.3 to 50 microns if not already of this particle size in the naturally occurring state, preparing a hydrosol of said polysaccharide by swelling the latter in water in the presence of a substance which aids the swelling, layering said hydrosol to a film, and drying the film formed.

5. A method of making transparent films, consisting in selecting an insoluble polysaccharide, dry grinding it to a particle size of approximately 0.3 to 50 microns if not already of this particle size in the naturally occurring state, preparing a hydrosol of said polysaccharide by swelling the latter in water in the presence of a soluble base, layering said hydrosol to a film, and drying the film formed.

FRIEDRICH EICHMANN.
HERBERT NERAD.